United States Patent
Otto et al.

(10) Patent No.: US 6,366,457 B1
(45) Date of Patent: Apr. 2, 2002

(54) BRACKET FOR MOUNTING A COMPUTER DRIVE DEVICE

(75) Inventors: William Fred Otto, Apex; Gerald Cecil Proctor, Raleigh, both of NC (US); Chen Hsuan-Tsung, Taipei Hsien (TW); Susan Pohl Wise, Leasburg, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/651,164

(22) Filed: Aug. 30, 2000

(51) Int. Cl.⁷ ................................................ H05K 5/00
(52) U.S. Cl. .................... 361/685; 361/798; 312/223.2; 439/327
(58) Field of Search ................................ 361/685, 800, 361/683, 684, 686, 724–727, 732, 740, 754, 755, 759, 798, 801; 312/223.2, 244, 331, 331.1, 334.23; 439/152–153, 327–328

(56) References Cited

U.S. PATENT DOCUMENTS

| | | | |
|---|---|---|---|
| 4,683,520 A | 7/1987 | Grassens et al. | 461/427 |
| 5,211,459 A | 5/1993 | Wu | 312/223.2 |
| 5,364,282 A * | 11/1994 | Tondreault | 439/157 |
| 5,548,480 A | 8/1996 | Rudi et al. | 361/685 |
| 5,564,804 A | 10/1996 | Gonzalez et al. | 312/223.2 |
| 5,629,836 A * | 5/1997 | Wrighr | 361/755 |
| 5,654,874 A | 8/1997 | Suzuki | 361/685 |
| 5,682,291 A | 10/1997 | Jeffries et al. | 361/685 |
| 5,726,864 A | 3/1998 | Copeland et al. | 361/685 |
| 5,768,099 A | 6/1998 | Radloff et al. | 361/685 |
| 5,818,689 A | 10/1998 | Johns et al. | 361/685 |
| 5,921,644 A | 7/1999 | Brunel et al. | 312/223.2 |
| 5,940,265 A | 8/1999 | Ho | 361/685 |
| 6,016,249 A | 1/2000 | Ogawa et al. | 361/685 |
| 6,088,221 A * | 7/2000 | Bolognia | 361/685 |
| 6,102,499 A | 8/2000 | Chen et al. | 312/223.2 |
| 6,198,633 B1 * | 3/2001 | Lehman et al. | 361/756 |

FOREIGN PATENT DOCUMENTS

| | | | |
|---|---|---|---|
| DE | 19544186 | 6/1997 | G06F/1/16 |
| DE | 19605231 | 8/1997 | G11B/31/00 |
| EP | 0831388 | 9/1996 | G06F/1/18 |
| EP | 0834880 | 4/1998 | G11B/33/00 |
| GB | 2338024 | 12/1999 | G06F/1/18 |
| JP | 3-224021 | 10/1991 | G06F/1/16 |
| JP | 6-125184 | 6/1994 | H05K/7/12 |
| WO | WO 98/43246 | 10/1998 | G11B/33/00 |

OTHER PUBLICATIONS

Handling Screen Savers, published at http://msdn.microsoft.com/library/psdk/shellcc/shell/Scrnsave.htm on May 8, 2001.

ScreenSaverProc, published at http://msdn.microsoft.com/library/psdk/shellcc/shell/functions/ScreenSaverProc.htm on May 8, 2001.

* cited by examiner

Primary Examiner—Leo P. Picard
Assistant Examiner—Hung Van Duong
(74) Attorney, Agent, or Firm—George E. Grosser; Ronald V. Davidge

(57) ABSTRACT

A bracket for installing a drive device within a computer housing includes first and second end panels extending along opposite sides of a lower panel. A pair of pins extending inward from the first side panel engages a pair of mounting holes in the drive device. The drive device is held with the mounting holes in engagement with the pins by means of a spring extending inward from the second end panel. The end of the drive device adjacent the second end panel is also held against an upper locating surface by a second biasing spring extending upward from the lower panel.

17 Claims, 2 Drawing Sheets

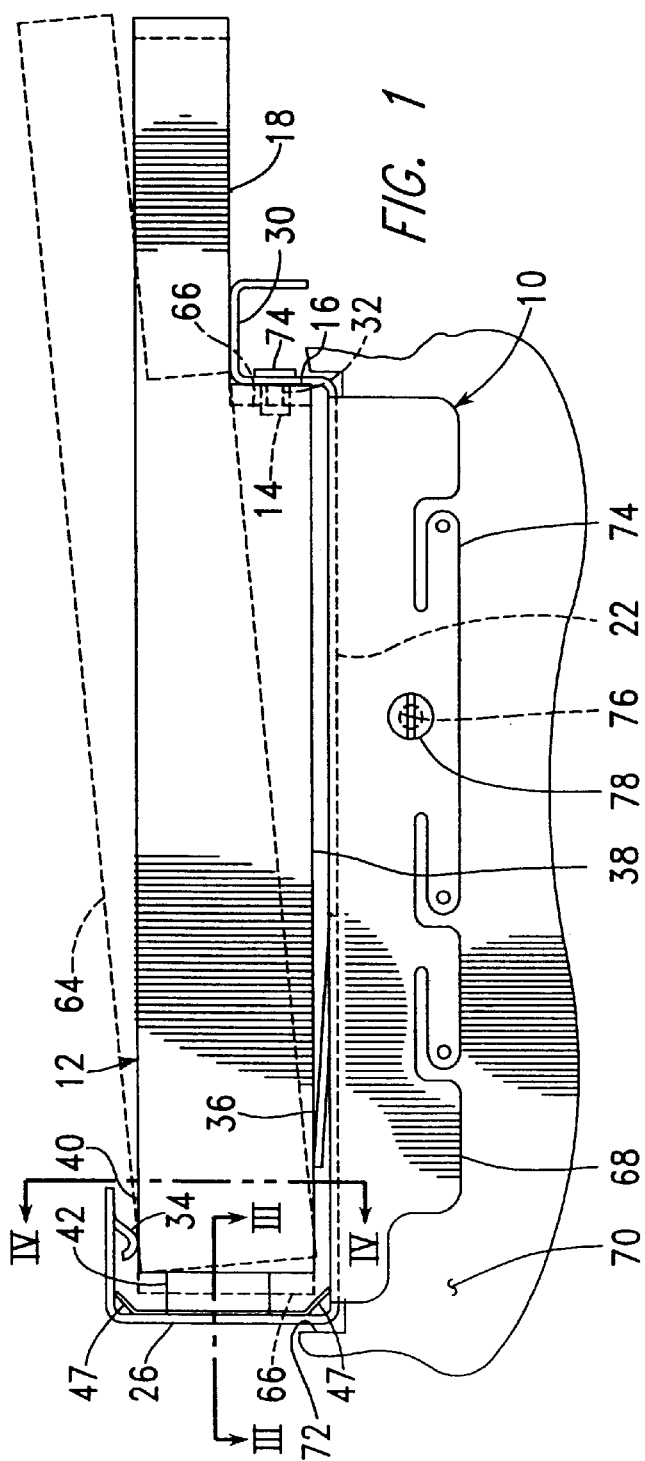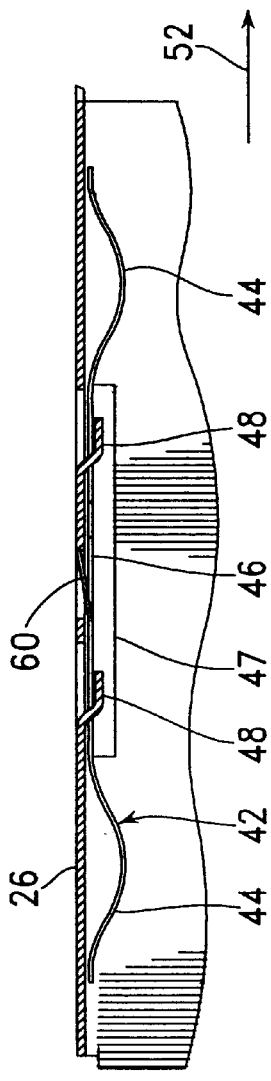

BRACKET FOR MOUNTING A COMPUTER DRIVE DEVICE

BACKGROUND INFORMATION

1. Field of Invention

This invention relates to a bracket for mounting a drive device within a computer, and, more particularly, to a bracket in which a CD ROM drive is mounted within a bay without access to screws conventionally used to install the drive.

2. Description of the Related Art

Typical computer systems include a number of device bays, in which drive devices are mounted by installation from the front of the system. Such drive devices include floppy disk drives, hard disk drives, and CD ROM drives. Often, these bays do not provide access to insert screws to engage the threaded mounting holes provided within the drive devices. While these mounting holes are typically provided along the left and right sides of the drive device, and often also along the bottom surface of the drive device, in many computing systems the bays only provide for attachment access from the front of the system. Therefore, a number of adapters have been devised to fasten to various of the threaded mounting holes, of a drive device, with the device attached to the adapter being installed from the front of the computer system. For example, a slide may be screwed to each side of a drive device, with the frame surfaces forming the drive bay being adapted for sliding engagement with the slides on opposite sides of the drive device.

As the size of drive devices has been substantially reduced, the size of screws used with the threaded mounting holes in the drive devices has been reduced, and the locations of such holes has often become increasingly inconvenient. Both of these factors make it increasingly difficult to fasten adapters to the drive devices using screws. Thus, what is needed is a method for fastening an adapter to a drive device without using screws.

The patent literature includes a number of example of brackets or other forms of adapters facilitating the installation of a drive device into a bay extending inward from the front of a computer system. For example, U.S. Pat. No. 5,564,804 describes a bracket, generally formed as a channel having a partly open top, for securing a computer drive within a housing. The bracket includes a number of holes for attaching the drive device within the bracket. As the bracket is slid into the housing, tabs within the housing, formed inward and extending opposite the direction in which the bracket is inserted, engage holes within the bracket, while tabs within the bracket, formed outward and extending in the direction in which the bracket is inserted, engage holes within the housing. Other examples of brackets or adapters for mounting drive devices in bays extending inward from a front of a computer are, in which conventional mounting screw arrangements are used to attach a drive device within the bracket or adapter, are found in U.S. Pat. Nos. 5,654,874, and 5,818,689, in European Patent Application EP0831388, and in Japanese Patent Applications 3-224021 and 6-125184. What is needed is a bracket in which it is not necessary to use screws for attachment to the drive device.

U.S. Pat. No. 5,682,291 describes a bracket formed as a carrier including a number of dowels that align with pre-existing screw holes within a computer device, such as a floppy disk drive, for securing the drive device within the carrier. When the drive device is placed into the carrier, a first dowel attached to the bottom panel of the carrier is inserted into a first screw hole of the device, partly securing the device to the carrier. The device is further secured to the carrier when both the device and the carrier together are inserted into a computer bay. As the carrier enters the computer bay, a second dowel flexibly attached to a side panel of the carrier is inserted into a second screw hole of the device. Therefore, whenever the device and the carrier are in the computer bay, the device is completely secured to the carrier. A potential limitation of this method arises from its reliance on the locations of holes in different surfaces of the drive device. Changes in the relative positions of such holes or shifting of the drive device within the carrier as the carrier is inserted may prevent the second dowel or additional dowels from being properly inserted within the drive device.

U.S. Pat. No. 5,548,480 describes a rectangular box structure in which a data storage device such as a tape drive is suspended. The box structure, which is secured within a computer housing, provides resilient leaf springs on a bottom wall and protrusions on a top wall for clasping the data storage drive unit within the box structure. The top, bottom, and side walls of the box structure are used together to create a resilient suspension for the data storage drive unit. Limitations of this structure arise from the fact that surfaces of the drive unit other than mounting holes are used to locate the drive unit within the box structure; these surfaces need to be repeatable from one drive unit to another, and differing types of drive units are not allowed to extend outside the box structure. Also, since resilient mounting does not locate the drive unit as accurately as mounting holes, problems may arise at a slot through which storage media is inserted.

European Patent Application EP0834880 describes a mounting arrangement for a drive unit in a desk top computer, which does not require the use of tools. The mounting arrangement employs two side members provided with studs that engage in side mounting holes conventionally provided within the drive unit. With the side members placed about the drive unit, the resultant assembly can be slid into position in a support structure along guides that also serve to hold the side members against the drive unit. In a preferred embodiment, the side members take the form of a wall element made of a plastic material and a U-shaped metal mounting element. On one side the mounting element has a projection that forms one of the side-member studs engaging the fixing holes of the drive unit. On the other side, the mounting element has a resilient contact arm providing a grounding connection to the support structure. This method has limitations associated with requiring that the studs on each side must each be inserted in a direction perpendicular to the adjacent side wall of the drive unit. Thus, the side members are either provided as two separate pieces, or as members of a single piece in which the side members are joined by a flexible bridge element, which must be bent substantially to allow the studs to enter all of the mounting holes. What is needed is a one-piece fastening mechanism allowing the movement of studs into mounting holes without requiring substantial bending of the adapter bracket.

U.S. Pat. No. 5,768,099 describes a computer having a mounting bracket, mounted to the chassis, for receiving a first disk drive and a mounting plate for receiving a second disk drive mounted relative to the bracket and to the chassis. The first drive unit is mounted in a conventional manner, with screws extending through the bottom plate of the mounting bracket, while the second disk drive is mounted by means of tabs extending upward and inward from the mounting plate along one side of the disk drive to engage mounting holes within the disk drive, and by means of tabs extending upward along the other side of the disk drive to hold screws fastened into the disk drive. Again, what is needed is a mounting method avoiding the need to use screws. Furthermore, since both the mounting bracket and the mounting plate are configured for attachment from above, this apparatus cannot be used to install disk drives into bays extending inward from the front of a computer, in which access from the top is not available.

U.S. Pat. No. 5,211,459 describes an installation kit for installing a disk drive into a larger disk drive bay. This kit includes a form factor adapter comprising a pair of side brackets which engage with a front plate to form an internal space. The disk drive inserts into the internal space, and a clip is used to secure the disk drive in place. The clip engages with the side brackets, so that no fasteners are required to secure the disk drive to the adapter. A limitation of this method arises from the fact that the clip engages the disk drive along its sidewalls, without extending into any holes or other alignment surfaces of the disk drive. Thus, friction alone is relied upon to hold the drive in place within the adapter in a front-to-rear direction. Clearance holes are provided for redundant use in mounting the disk drive within the side brackets. What is needed is a mounting method engaging at least certain mounting holes without a need to install screws.

SUMMARY OF THE INVENTION

According to a first aspect of the present invention, there is provided a bracket for installing, within a computer housing, a drive device, having first and second mounting surfaces extending parallel to each other along opposite sides of a portion of the drive device and an upper surface extending adjacent the second mounting surface, in which the bracket includes a lower panel, first and second side panels, a first pin, first and second biasing springs, and an upper locating surface. The lower panel has first and second edges extending parallel to each other at opposite sides of the lower panel. The first side panel extends along the first edge of the lower pane. The second side panel extends along the second edge of the lower panel. The first pin extends inward from the first side panel for engaging a first mounting hole within the first mounting surface of the drive device. The first biasing spring extends inward from the second panel for engaging the second mounting surface of the drive device to hold the first mounting hole in engagement with the first pin. The upper locating surface extends from the second side panel adjacent the upper surface of the drive device. The second biasing spring extends upward from the lower surface for holding the upper surface of the drive device in engagement with the upper locating surface.

BRIEF DESCRIPTION OF THE DRAWINGS

FIG. 1 is a front elevation of a drive device mounting bracket built in accordance with the present invention, with a CD ROM drive device installed therein;

FIG. 3 is a fragmentary horizontal cross-section of the mounting bracket of FIG. 1, taken as indicated by section lines III—III therein to show a device biasing spring.

DESCRIPTION OF THE INVENTION

Figure 2:
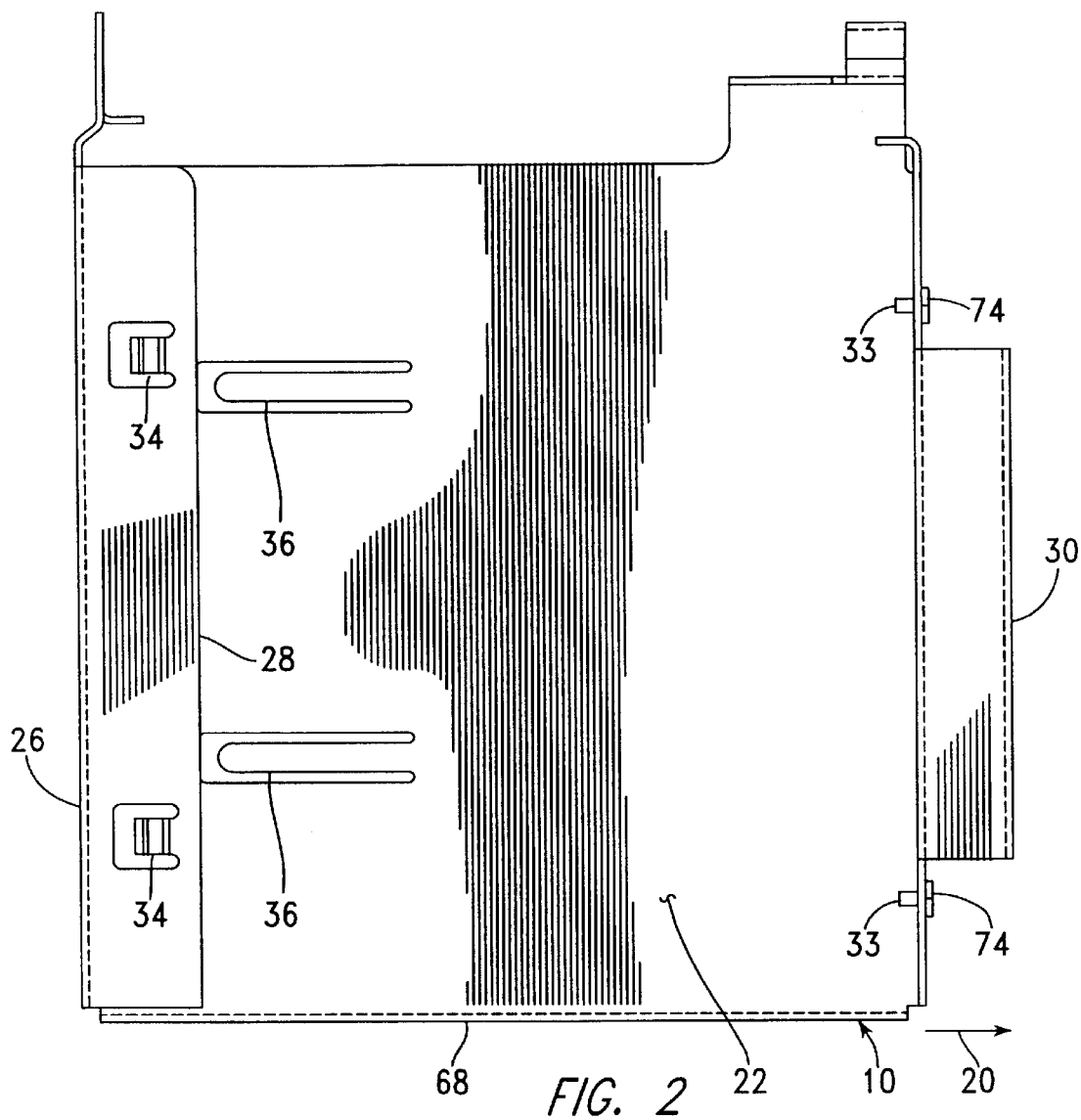
FIG. 2 is a plan view of the drive device mounting bracket of FIG. 1.

FIG. 1 is a front elevation of a drive device mounting bracket, generally indicated as 10, with a drive device, generally indicated as 12, installed therein. In the example of FIG. 1, the drive device 12 is a slim CD-ROM device configured particularly for use in laptop computers. This drive device 12 includes, for purposes of installation within a structure, a first pair of M2 threaded holes 14, extending inward from a right mounting surface 16. An upper portion 18 of the drive device 12 overextends the right mounting surface 16 in the rightward direction of arrow 20.

FIG. 2 is a plan view of the mounting bracket 10. Referring to FIGS. 1 and 2, the mounting bracket 10 is generally shaped as a channel having a bottom panel 22, a right side panel 24 and a left panel 26, together with an inward-extending upper flange 28 at the top of the left panel 26. A central portion of the right side panel 24 is formed into a small channel 30, providing stiffness for the right side panel 24.

The drive device 12 is held in place within the mounting bracket 10 by means of a pair of pins 32 extending inward from the right side panel 24, into the threaded mounting holes 14 of the drive device 12, and by means of a pair of upper locating tabs 34 extending downward from the inward-extending upper flange 28. A pair of cantilever spring tabs 36, extending upward from the bottom panel 22, exert upward forces on the adjacent lower surface 38 of the drive device 12, so that a left upper surface 40 of this device 12 is held against the upper locating tabs 34. A device biasing spring 42 applies forces acting in the rightward direction of arrow 20 to hole the threaded holes 14 of the drive device 12 in place over the pins 32.

Figure 4:
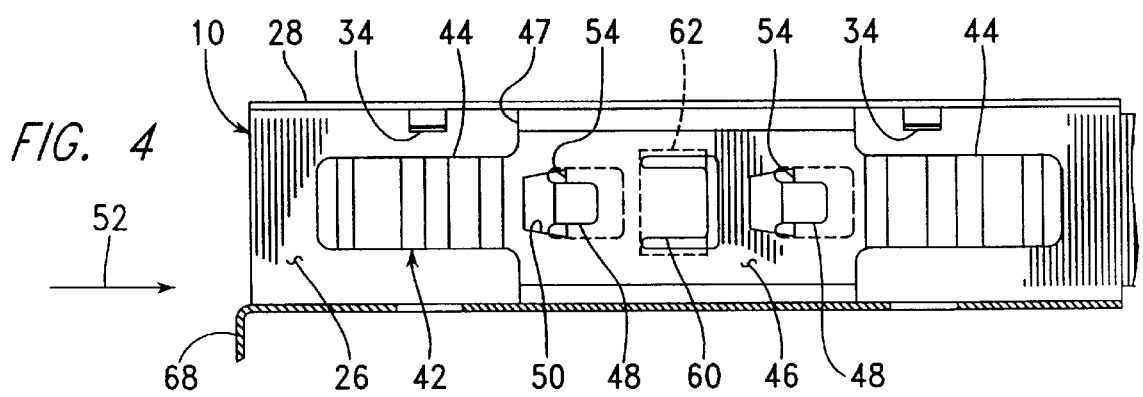
FIG. 4 is a fragmentary vertical cross-section of the mounting bracket of FIG. 1, taken as indicated by section lines IV—IV therein to show the device biasing spring of FIG. 3.

FIGS. 3 and 4 are cross-sectional views of the mounting bracket 10 particularly showing the configuration of the device biasing spring 42. FIG. 3 is a horizontal cross-sectional view taken as indicated by section lines III—III in FIG. 1, and FIG. 4 is a vertical cross-sectional view taken as indicated by section lines IV—IV in FIG. 1. Referring to FIGS. 3 and 4, the device biasing spring 42 has an undulating cantilever spring segment 44 extending from each end of a central section 46. The central section 46 includes a number of features which are used to hold the biasing spring 42 in place within the mounting bracket 10. For example, inclined flanges 47 of the central section 46 hold the biasing spring 42 in place between the lower panel 22 and the upper flange 28 of the mounting bracket 10. The left panel 26 of the mounting bracket 10 includes a pair of spring attachment tabs 48, which extend inward through apertures 50 of the device biasing spring 42 and rearward, in the direction of arrow 52.

Thus, the device biasing spring 42 is installed within the mounting bracket 10 by placing the spring 42 inside the mounting bracket 10 against the left panel 26 of the mounting bracket 10 with the apertures 50 of the spring 42 extending through the tabs 48 of the mounting bracket 10, and by subsequently moving the spring 42 forward, opposite the direction of arrow 52, so that the rear edge 54 of each aperture 50 moves within the adjacent tab 58. When the device biasing spring 42 has moved far enough opposite the direction of arrow 52, an outward formed latching tab 60 moves into an aperture 62 in the left panel 26 of the mounting bracket 10. This latching tab 60 then prevents movement of the device biasing spring 42 in the rearward direction of arrow 52, so that the spring 42 is held in position within the bracket 10.

Referring again to FIG. 1, installation of the drive device 12 within the mounting bracket 10 begins with placing the drive device 12 in the inclined position indicated by dashed lines 64, with the left upper surface 40 of the device 12 under the upper locating tabs 34, and with the lower surface 38 of the drive device 12 resting on the top of the right panel 24. The drive device 12 is next slid to the left, opposite the direction of arrow 20, with the right mounting surface 16 of the drive device 12 being lowered into the cavity extending between the left panel 26 and the right panel 24 of the mounting bracket 10. This movement causes deflection of the undulating cantilever portions 44 of the device biasing spring 42. In this way, the drive device 12 is brought into the leftmost position indicated by dashed lines 66. Next, the drive device 12 is moved to the right, in the direction of arrow 20, with the mounting holes 14 of the drive device 12 moving over the pins 32 of the mounting bracket 10. After this installation is complete, force from the deflection of cantilever spring sections 44 continues to hold the drive device 12 fully engaged with the pins 32, while the deflection of cantilever spring portions 36 of the lower panel 22 holds the upper left surface 40 of the device 12 in place against the upper locating tabs 34.

The mounting bracket 10 also includes a downward extending front flange 68, which is used for attaching the mounting bracket 10 to a computer housing 70 after the drive device 12 is installed within the mounting bracket 10 as described above. The computer housing 70 includes an aperture 72 through which the mounting bracket extends when it is installed. The front flange 68 includes a number of cantilever tabs 74, which improve electrical grounding conditions between the computer housing 70 and the mounting bracket 10, and a hole 76 through which a single screw 78 is driven to fasten the mounting bracket 10 to the computer housing 70.

The mounting bracket 10 is preferably stamped and formed from a sheet of steel, with the pins 32 forming parts of steel rivets 74 pressed into place, and with the device biasing spring 42 being added as a separate piece, as described in detail above. The pins 32 are preferably solid steel cylinders having a diameter of 1.45 mm to fit within the M2 threaded holes 14 of the exemplary drive device 12. This construction provides a significant advantage in terms of strength and stiffness in comparison to generally square pins stamped from a bracket tab, as described in U.S. Pat. No. 5,768,099, or the pins either formed from a thin metal contact material or formed as extensions of a molded plastic part, as described in European Pat. Application EP0834880.

While the present invention has been described in its preferred form or embodiment with some degree of particularity, it is understood that this description has been given only by way of example and that numerous changes in the details of construction, fabrication, and use, including changes in the combination and arrangement of parts, may be made without departing from the spirit and scope of the invention. While various directional descriptions, such as downward and rightward, have been applied herein, it is understood that the present invention can be used in various orientations without departing from the spirit and scope of the invention.

What is claimed:

1. A bracket for installing, within a computer housing, a drive device, having first and second mounting surfaces extending parallel to each other along opposite sides of a portion of said drive device and an upper surface extending adjacent said second mounting surface, wherein said bracket comprises:
   a lower panel having first and second edges extending parallel to each other at opposite sides of said lower panel;
   a first side panel extending along said first edge of said lower panel;
   a second side panel extending along said second edge of said lower panel;
   a first pin extending inward from said first side panel for engaging a first mounting hole within said first mounting surface of said drive device;
   a first biasing spring extending inward from said second panel for engaging said second mounting surface of said drive device to hold said first mounting hole in engagement with said first pin;
   an upper locating surface extending from said second side panel adjacent said upper surface of said drive device; and
   a second biasing spring extending upward from said lower surface for holding said upper surface of said drive device in engagement with said upper locating surface.

2. The bracket of claim 1, wherein said first pin comprises a solid metal cylinder.

3. The bracket claim 1, additionally comprising a second pin extending inward from said first side panel for engaging a second mounting hole within said first mounting surface of said drive device.

4. The bracket of claim 1, wherein said upper locating surface includes:
   an upper flange extending inward from an upper edge of said second side panel; and
   a first contact tab extending downward from said upper flange.

5. The bracket of claim 1, wherein said first biasing spring includes an attachment portion held in place on said second side panel and a first cantilever spring portion extending from said attachment portion.

6. The bracket of claim 1, wherein said second biasing spring extends as a cantilever portion of said lower panel.

7. The bracket of claim 3, wherein said first and second pins each comprise a solid metal cylinder.

8. The bracket of claim 4, wherein said upper locating surface additionally includes a second contact tab extending downward from said upper flange.

9. The bracket of claim 5, wherein
   said first cantilever spring portion extends from a first end of said attachment portion, and
   said first biasing spring also includes a second cantilever spring portion extending from said attachment portion.

10. The bracket of claim 5, wherein
   said second side panel includes a hook extending inward and in a first direction along said second side panel and a latching aperture,
   said attachment portion of said first biasing spring includes a latching tab extending outward and in said first direction along said attachment portion and an attachment aperture, and
   said first biasing spring is moved into place by placing said attachment aperture over said hook and by then sliding said first biasing spring opposite said first direction until said latching tab moves into said latching aperture.

11. Apparatus comprising:
   a housing having a bracket mounting aperture;
   a drive device including first and second mounting surfaces extending parallel to each other along opposite sides of a portion of said drive device, a first mounting hole within said first mounting surface, and an upper surface extending adjacent said second mounting surface; and
   a bracket fastened to said housing and extending within said bracket mounting aperture, wherein said bracket includes a lower panel having first and second edges extending parallel to each other at opposite sides of said lower panel, a first side panel extending along said first edge of said lower panel, a second side panel extending along said second edge of said lower panel, a first pin extending inward from said first side panel within said first mounting hole, a first biasing spring extending inward from said second panel engaging said second mounting surface of said drive device to hold said first mounting hole in engagement with said first pin, an upper locating surface extending from said second side panel adjacent said upper surface of said drive device, and a second biasing spring extending upward from said lower surface for holding said upper surface of said drive device against said upper locating surface.

12. The apparatus of claim 11, wherein said drive device additionally includes a second mounting hole within said first mounting surface, and said bracket additionally includes a second pin extending inward from said first side panel within said second mounting hole.

13. The apparatus of claim 11, wherein said drive device includes an upper portion extending over said first side panel.

14. The apparatus of claim 11, wherein said second side panel includes a hook extending inward and in a first direction along said second side panel and an aperture, said first biasing spring includes a latching tab extending outward and in said first direction, an attachment aperture, and a cantilever spring portion extending at each end of said first biasing spring, and said first biasing spring is moved into place by placing said attachment aperture over said hook and by then sliding said first biasing spring opposite said first direction until said latching tab moves into said latching aperture.

15. A method for securing a drive device within a housing, wherein said method comprises steps of:

placing said drive device on a drive mounting bracket with a lower surface of said drive device extending along a top surface of a first side panel of said drive mounting bracket and with a first end of said drive device extending between a lower panel of said drive mounting bracket and an upper locating surface extending from an upper edge of a second side panel of said drive mounting bracket, wherein said first and second side panels extend parallel to each other along opposite sides of said lower panel;

moving said drive device toward said second side panel and lowering said drive device to place mounting holes in said drive device adjacent pins extending inward from said first side panel;

sliding said drive device away from said second side panel, with said pins extending inward from said first side panel extending within said mounting holes and with a first biasing spring holding said drive device away from said second side panel; and fastening said drive mounting bracket into said housing.

16. The method of claim 15, wherein said step of placing said drive device on a drive mounting bracket is preceded by:

placing an aperture of said first biasing spring over a hook extending inward and in a first direction from said second side panel; and moving said first biasing spring opposite said first direction until a latching spring forming a portion of said first biasing spring moves into an aperture within said second side panel.

17. The method of claim 15, wherein said drive device is held against said upper locating surface by a second biasing spring extending upward from said lower panel.

* * * * *